United States Patent [19]

Saxena et al.

[11] Patent Number: 5,741,859
[45] Date of Patent: Apr. 21, 1998

[54] BLOCK COPOLYMERS OF POLYISOBUTYLENE AND POLYDIMETHYLSILOXANE

[75] Inventors: Anil Kumar Saxena; Toshio Suzuki, both of Midland, Mich.

[73] Assignee: Dow Corning Corporation, Midland, Mich.

[21] Appl. No.: 794,695

[22] Filed: Feb. 3, 1997

[51] Int. Cl.$^6$ .................................................. C08F 8/00
[52] U.S. Cl. .......................... 525/106; 525/479; 528/37
[58] Field of Search .............................. 525/106, 479; 528/37

[56] References Cited

FOREIGN PATENT DOCUMENTS 7-102017  10/1993  Japan .
7-53882   2/1995   Japan .

OTHER PUBLICATIONS

Journal of Applied Polymer Science: Applied Polymer Symposium 39, 21–35 (1984) 'New Telechelic Elastomers'; Joseph P. Kennedy.

J. Macromol. Sci.–Chem., A24(9), pp. 1033–1049 (1987); Synthesis of Polydimethylsiloxane . . .

*Primary Examiner*—Melvyn I. Marquis
*Attorney, Agent, or Firm*—Alexander Weitz

[57] ABSTRACT

The present invention relates to a method for preparing a polyisobutylene-siloxane block copolymer, said method comprising:

(I) lithiating (A) a polyisobutylene having one or two terminal silanol groups with (B) an organolithium compound;

(II) reacting the silanolate-functional polyisobutylene obtained in step (I) with (C) a hexaorganocyclotrisiloxane; and (III) capping the siloxanotate-functional block copolymer obtained in step (II) with a compound selected from (D) a silane having at least one hydrolyzable group or (E) an acid.

21 Claims, No Drawings

BLOCK COPOLYMERS OF POLYISOBUTYLENE AND POLYDIMETHYLSILOXANE

FIELD OF THE INVENTION

The present invention relates to block copolymers of polyisobutylene and polydiorganosiloxane. More particularly, the invention relates to a method for preparing said block copolymers via a non-equilibrium anionic polymerization of a diorganocyclotrisiloxane using a silanolate-functional polyisobutylene as the initiator.

BACKGROUND OF THE INVENTION

Diorganopolysiloxane-polyisobutylene block copolymers are described by L. Wilczek et al. *J. Macromol. Sci.-Chem.*, A24(9), 1033–1049 (1987). These copolymers are prepared from telechelic polyisobutylene (PIB) polymers having alcoholic ($-CH_2OH$) terminal groups. The telechelic alcohol-functional PIB is first reacted with butyllithium to form an alcoholate-functional PIB dianion and the latter is then reacted with hexamethylcyclotrisiloxane ($D_3$) to generate a living polydimethylsiloxane (PDMS) chain at each terminus of the PIB. In a final step, the remaining anionic ends are capped with trimethylchlorosilane or dimethyldichlorosilane to provide a PDMS-PIB-PDMS triblock copolymer or a -(PDMS-PIB-PDMS)-$_n$ multiblock copolymer, respectively.

In commercial application, the above described method has two major drawbacks. First, the resulting block copolymer has its polydimethylsiloxane segments linked to the PIB segment(s) via a $\equiv C-O-Si\equiv$ group. And, although Wilczek et al. indicate that their triblock copolymer has satisfactory hydrolytic resistance in some cases, such a linking group is notoriously unstable in moist environments, particularly under acidic conditions and/or at elevated temperatures.

Second, the precursor hydroxyl-functional PIB is not readily obtained in a commercially viable process. For example, Japanese publication (Kokai) 7-102017 to Kanegafuchi Chemical industry discloses the preparation of various polymers having terminal unsaturation by reacting the corresponding hydroxyl-terminated hydrocarbon polymer with a compound such as an allyl halide. The starting polymer, which must contain at least 1.1 hydroxyl groups per molecule, can be prepared by carrying out a chain scission of a hydrocarbon polymer chain by reacting it with ozone, followed by reduction with lithium aluminum hydride. This method for producing the hydroxy-functional precursor polymer has a disadvantage in that the chain scission results in an undesirable reduction of polymer molecular weight, as observed in Reference Example 1 of the above mentioned Kanegafuchi publication.

In another approach, allylic functionality on polyisobutylene can be converted to hydroxyl by a hydroboration-oxidation sequence. This two-stage process employs treatment of the polymer with diborane or 9-borabicyclo{3.3.1}nonane (9-BBN), followed by reaction with hydrogen peroxide, to convert C=C groups to alcohol-containing groups. Hydroboration with diborane results in some secondary hydroxyl formation, whereas 9-BBN is highly regioselective and gives only primary alcohols. Thus, this technique may be used to prepare a polyisobutylene polymer having end groups of the formula $-CH_2CH_2CH_2-OH$. However, even this technique has distinct disadvantages in that the hydroboration of allyl-functional polyisobutylene is difficult. In addition to being quite expensive, the boranes are flammable and react violently with water and are therefore hazardous. Furthermore, the above mentioned oxidation of the hydroboration product by $H_2O_2$ adds to the complexity of this synthesis scheme.

Furthermore, the above described hydroxyl-functional PIB reacts very slowly with the butyllithium and the PIB anion is thus not readily generated.

There is therefore a need for an improved method for the production of silicone-PIB block copolymers.

SUMMARY OF THE INVENTION

It has now been discovered that various diorganopolysiloxane-PIB block copolymers can be prepared such that the diorganopolysiloxane segments are linked to the PIB segment(s) via an $\equiv Si-C\equiv$ bond, this linking group having significantly superior hydrolytic stability relative to the above mentioned $\equiv C-O-Si\equiv$ linkage. Moreover, the preparative methods disclosed herein employ a silanol-functional PIB as a starting material, this precursor being readily synthesized from the corresponding vinyl or allyl-functional polymer. The silanol groups react quickly with butyllithium and formation of the PIB anion is thus essentially instantaneous.

The present invention, therefore, relates to a method for preparing a polyisobutylene-siloxane block copolymer comprising:

(I) initiating (A) a polyisobutylene having one or two terminal silanol groups with (B) an organolithium compound to provide a silanolate-functional polyisobutylene;

(II) reacting the silanolate-functional polyisobutylene with (C) a hexaorganocyclotrisiloxane of the formula $(R_2SiO)_3$ in which R is a monovalent group independently selected from the group consisting of alkyl radicals having 1 to 6 carbon atoms, aryl radicals having 6 to 10 carbon atoms, halogenated alkyl radicals having 2 to 6 carbon atoms to form a siloxanolate-functional block copolymer; and (III) capping the silloxanolate-functional block copolymer with a compound selected from the group consisting of (D) a silane of the formula $R'_{(4-a)}SiX_a$ wherein $R'$ is a monovalent group independently selected from the group consisting of alkyl radicals having 1 to 6 carbon atoms, alkenyl radicals having 2 to 6 carbon atoms, aryl radicals having 6 to 10 carbon atoms, halogenated alkyl radicals having 2 to 6 carbon atoms, acryloxyalkyl radicals having 4 to 10 carbon atoms, methacryloxyalkyl radicals having 4 to 10 carbon atoms and alkenylaryl radicals having 8 to 14 carbon atoms, X is a hydrolyzable group and a is an integer having a value of 1 to 4, and (E) an acid.

DETAILED DESCRIPTION OF THE INVENTION

For the purposes of the present invention, the backbone of the polyisobutylene (PIB) polymer (A) may be any linear or branched polymer or copolymer wherein at least about 50 mole percent, preferably at least 80 mole percent, of the repeat units are isobutylene repeat units of the following structure

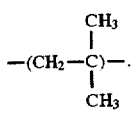

One or more hydrocarbon monomers, such as isomers of butylene, styrene, derivatives of styrene, isoprene and butadiene, may be copolymerized with the isobutylene, the preferred co-monomer being selected from 1-butene, α-methyl styrene, p-methylstyrene or isoprene. As used herein, the term "polymer" is generic to polymers, oligomers and copolymers of isobutylene, all of which are within the scope of the instant invention. However, in order to prepare the diorganopoiysiloxane-PIB block copolymers of the invention, described infra, the polyisobutylene polymer (A) must contain, or be modified to contain, one or two terminal carbon-bonded silanol group(s) (i.e., —C—SiOH).

Most preferably, the polymer is a homopolymer consisting essentially of isobutylene repeat units. A polyisobutylene (PIB), which contains only one unsaturated group and which can readily be converted to a PIB having one silanol terminal group and subsequently to a diorganopolysiloxane-PIB block copolymer, according to the methods described infra, is available commercially in a variety of molecular weights from, e.g., the Amoco Chemical Company (Chicago, Ill.) under the trade name Indopol™, from BASF Aktiengesellschaft (Germany) under the trade name Glissopal™ and from BP Chemicals Ltd. (London) under the trade name Ultravis™. Likewise, telechelic PIB having approximately two such unsaturated groups (i.e., a functionality of about 2.0) can be converted to telechelic silanol-functional PIB and, in turn, to the block copolymers of the invention. Several such telechelic PIBs having allyl terminal groups are available from Kanegafuchi Kagaku Kogyo Kabushiki Kaisha, Osaka, Japan under the trade name EPION™.

According to the method of the present invention, the silanol-functional PIB (A) has its silanol group (or groups) located at the terminal (or terminals) of the polymer chain. Such silanol-functional polyisobutylenes are known in the art. For example, Japanese patent publication 7-053882 to Kanegafuchi discloses the hydrosilation of an allyl-functional PIB with an SiH-functional cyclic polysiloxane, followed by hydrolysis in the presence of a palladium catalyst. Further, a PIB which contains a hydrolyzable group, such as an alkoxysiloxy group, may be hydrolyzed to provide the silanol-functional polymer. For other suitable methods for the synthesis of the silanol-functional polymer, the interested reader is referred to the article by P. D. Lickiss in *Advances in Inorganic Chemistry*, v. 42, p. 142 (1995).

Preferably, the silanol-functional polymer (A) is prepared by first silylating the corresponding allyl- or vinyl-functional polymer with a silane of the formula $$HSiR_2(Z) \qquad (i)$$

followed by hydrolysis of the resulting hydrolyzable group-functional polymer. In formula (i), R is independently selected from the group consisting of alkyl radicals having 1 to 6 carbon atoms, halogenated alkyl radicals having 1 to 6 carbon atoms and aryl radicals having 6 to 18 carbon atoms. Examples of suitable R radicals include alkyl radicals, such as methyl, ethyl, propyl, isopropyl, butyl, isobutyl, pentyl and hexyl; aryl radicals such as phenyl, tolyl, xylyl, benzyl, alpha-methyl styryl and 2-phenylethyl; and halogenated hydrocarbon radicals such as 3,3,3-trifluoropropyl and 3-chloropropyl. Preferably, R is selected from the group consisting of alkyl radicals having 1 to 6 carbon atoms and phenyl, most preferably a methyl radical. Z is a hydrolyzable group, such as halogen, alkoxy, acyloxy, alkenyloxy, oximo and aminoxy, inter alia. Preferably, Z is chlorine.

Synthesis of the silanol-functional PIB is illustrated by the following two equations, wherein "PIB" represents the polyisobutylene chain residue and Z is chlorine. In these illustrations, the connecting group between the polymer and the silicon atom is ethylene (i.e., derived from a vinyl-functional PIB), but it is contemplated that, in general, this connecting group (R") can be a divalent hydrocarbon group having 2 to 10 carbon atoms provided it is derived from a group having terminal unsaturation and is attached to one end of the PIB chain.

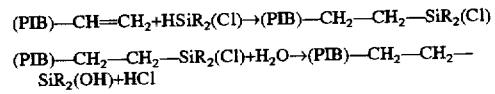

The first of these reactions is typically catalyzed by a hydrosilation catalyst, such as platinum on carbon, chloroplatinic acid or a platinum complex, as well known in the art. Typically, this reaction is carried out either neat or, preferably, in an organic solvent solution (e.g., toluene) at a temperature of about 0° to 250° C., preferably about 20° to 150° C., most preferably at 40° to 100° C. When Z is the preferred chlorine group, the second (hydrolysis) reaction is generally carried out at about 0 to 60° C, preferably in the presence of a base such as sodium bicarbonate which is used to neutralize the hydrochloric acid generated. It is understood that a similar set of equations would apply in the preparation of a telechelic polymer having a silanol group at each terminus.

In a first embodiment of the present invention, the above described polyisobutylene having one terminal silanol group is lithiated with organolithium compound (B) to provide a silanolate-functional polyisobutylene. For the purposes of the present invention, the term "silanolate-functional polyisobutylene" is used to indicate a PIB having a terminal group of the type ≡C—SiR$_2$O$^-$ where R has its previously defined meaning. This lithiation step is illustrated by the following equation, wherein the connecting group between the polymer and the silicon atom is the above defined generic group R":

In the previous equation, PIB again represents the polymer residue. R'" is selected from the group consisting of alkyl radicals having 1 to 6 carbon atoms, mesityl radical and phenyl and R has its previously defined meaning. Preferably, the organolithium compound is n-butyllithium, sec-butyllithium, tert-butyllithium or methyl lithium. The amount of organolithium compound used can be a stoichiometric quantity based on the SiOH content of polymer (A), but less than stoichiometric amounts are preferably used. Thus, a molar ratio of Li to ≡SiOH of 0.05 to 1.0 is typically employed but a ratio of 0.05 to 0.95 is preferred and a ratio of 0.3 to 0.95 is most preferred. When this ratio is more than 1, siloxane homopolymer is formed as a byproduct. The above reaction is carried out in solution under a dry, inert atmosphere, such as nitrogen or argon. Suitable solvents for this purpose include tetrahydrofuran, diethyl ether, benzene and toluene, inter alia. Typically, this lithiation step is run at ordinary ambient conditions but can also proceed at a temperature of about −78° to 50° C.

The above described silanolate-functional polyisobutylene is then reacted with a hexaorganocyclotrisiloxane (C) of the formula

(ii)

to form a siloxanolate-functional block copolymer, wherein R has its previous definition. Preferably, component (C) is hexamethylcyclotrisiloxane. For the purposes of the present invention, the term "siloxanolate-functional polyisobutylene" is used to indicate a PIB having a terminal group of the type $\equiv C-(R_2)SiO(R_2SiO)_n(R_2)SiO^-$ where R has its previously defined meaning and n is representative of the degree of polymerization of the siloxane segment and is at least 1. This reaction may be illustrated by the following equation, wherein PIB, R, R" and n have their previously defined meanings:

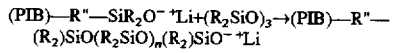

(PIB)—R"—SiR$_2$O$^-$ $^+$Li+(R$_2$SiO)$_3$→(PIB)—R"—(R$_2$)SiO(R$_2$SiO)$_n$(R$_2$)SiO$^-$ $^+$Li

When less than a stoichiometric amount of organolithium compound (D) is used, the lithium silanolate undergoes facile exchange reactions with silanol groups, as described by T. Suzuki in *Polymer*, 30, 333 (1989). This anionic polymerization reaction can be run neat under dry, inert conditions, but is preferably conducted in the presence of solvent. Suitable solvents for this reaction include those recited in connection with the formation of the silanolate-functional polyisobutylene, supra. This reaction is again typically carried out at ambient conditions but can also be run at temperatures of about −20° to about 100° C. Further, certain promoters are generally added in the above reaction in order to facilitate the polymerization of the hexaorganocyclotrisiloxane. Such promoters are illustrated by acetonitrile, dimethylformamide, dimethylsulfoxide and hexamethylphosphoramide, inter alia. Typically, from about 1 to about 10 parts by weight of at least one promoter is used for each 100 parts by weight of the hexaorganocyclotrisiloxane (C). The anionic polymerization is preferably terminated, as described infra, before all of the hexaorganocyclotrisiloxane is used up if a narrow molecular weight distribution of the siloxane chain is desired. The molecular weight of the siloxane can also be controlled by adjusting the ratio of the silanolate-functional PIB to the hexaorganocyclotrisiloxane.

In the final step of the first embodiment, the above described siloxanolate-functional block copolymer is capped (terminated) with a silane (D) having the formula

(iii)

wherein R' is a monovalent group independently selected from the group consisting of alkyl radicals having 1 to 6 carbon atoms, alkenyl radicals having 2 to 6 carbon atoms, aryl radicals having 6 to 10 carbon atoms, halogenated alkyl radicals having 2 to 6 carbon atoms, acryloxyalkyl radicals having 4 to 10 carbon atoms, methacryloxyalkyl radicals having 4 to 10 carbon atoms and alkenylaryl radicals having 8 to 14 carbon atoms. Examples of the later radicals include vinylphenyl, allylphenyl and vinylbenzyl. Preferably, R' is selected from the group consisting of methyl, phenyl, vinyl, allyl, methacryloxypropyl and acryloxypropyl. In formula (iii), X is a hydrolyzable group and may be selected from the same groups as above described group Z, preferably acyloxy, such as acetoxy, or halogen, such as chlorine.

Subscript a in the above formula is an integer having a value of 1 to 4 and, as those skilled in the art will readily appreciate, its value determines the specific type of block copolymer obtained. Thus, for example, when a=1, a diblock copolymer of the type AB is formed wherein A represents the diorganopolysiloxane block and B represents the PIB block according to the following equation, wherein PIB, R, R', R", X and n have their previously defined meanings and the molar ratio of Li to $\equiv$SiOH is 1.0:

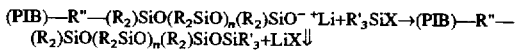

(PIB)—R"—(R$_2$)SiO(R$_2$SiO)$_n$(R$_2$)SiO$^-$ $^+$Li+R'$_3$SiX→(PIB)—R"—(R$_2$)SiO(R$_2$SiO)$_n$(R$_2$)SiOSiR'$_3$+LiX↓

Similarly, when subscript a=2 in formula (iii), triblock copolymers of the type BA-AB are formed in which two diorganopolysiloxane segments are joined through a siloxane bond. Further, when a is 3 or 4, branched and star block copolymers can be prepared having the following respective schematic structures

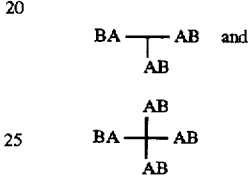

BA—AB and
  |
  AB

AB
   |
BA—AB
   |
   AB wherein B again represents the PIB block and A represents the diorganopolysiloxane block. When the molar ratio of Li to $\equiv$SiOH in the above method is less than 1.0, an acid acceptor is preferably used to facilitate the capping reaction (e.g., an amine such as triethylamine or tributylamine).

The above capping reaction is also carried out at ambient conditions or at a temperature of −78° to 200° C. and the salt byproduct generally formed (e.g., LiCi) is filtered off. The final block copolymer is then isolated by, e.g., stripping off residual hexaorganocyclotrisiloxane (C), solvent and any other volatile components and it may be purified by methods known in the art (e.g., precipitation from solution).

Alternatively, the above described siloxanolate-functional block copolymer may be quenched with an acid (E). Suitable acids include organic acids such as acetic, propionic, butanoic acid and acrylic acid, among others, and inorganic acids such as dilute HCl, H$_2$SO$_4$, HNO$_3$ and HCO$_3$. Preferred acids are acetic acid and volatile acids, such as carbonic acid, which are easily removed by typical stripping conditions (e.g., heat and vacuum). In this case, the reaction results in silanol-ended block copolymer according to the following equation, wherein PIB, R, R" and n have their previously defined meanings and Q is the acid counterion:

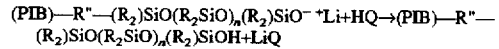

(PIB)—R"—(R$_2$)SiO(R$_2$SiO)$_n$(R$_2$)SiO$^-$ $^+$Li+HQ→(PIB)—R"—(R$_2$)SiO(R$_2$SiO)$_n$(R$_2$)SiOH+LiQ

This variation of the first embodiment is preferred when the molar ratio of Li to $\equiv$SiOH in the above described lithiation step is less than 1.0 since all of the propagating chain ends are converted to silanols. According to this scheme, copolymers of the type AB are prepared, wherein A is diorganopolysiloxane and B is PIB. This quenching reaction may be carried out under the same temperature conditions as capping with above described silane (D).

In a second embodiment of the present invention, component (A) is a telechelic silanol-ended PIB of the formula

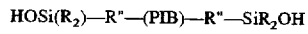

HOSi(R$_2$)—R"—(PIB)—R"—SiR$_2$OH     (iv)

wherein PIB, R and R" have their previously defined meanings. This silanol-ended PIB is lithiated with the organolithium compound (B) and then reacted with hexaorganocyclotrisiloxane (C), as in the first embodiment, to form a telechelic siloxanolate-functional PIB of the formula

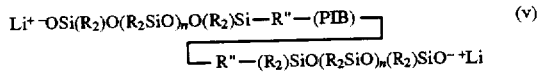

(v)

wherein PIB, R, R" and n have their previously defined meanings. The latter, in turn, is capped with silane (D) wherein subscript a is 1 or 2 or with acid (E), as described above.

In this case, the skilled artisan will recognize, a variety of block copolymers can be produced. For example, using silane (D) wherein a=1 (or the acid) as the capping reagent results in triblock ABA systems. When silane (D) contains two hydrolyzable groups (i.e., a in formula iii is 2), multiblock systems of the type (—AB—)$_m$ can be formed in which m is an integer having a value of 2 or more. Again, in the above schematic representations, A is diorganopoiysiloxane block and B is PIB block.

The block copolymers of the invention find utility as intermediates in the preparation of coatings and elastomers. They also find application as surfactants, additives and compatibilizers.

EXAMPLES

The following examples are presented to further illustrate the methods of this invention, but are not to be construed as limiting the invention, which is delineated in the appended claims. All parts and percentages in the examples are on a weight basis and all measurements were obtained at 25° C.±2° C., unless indicated to the contrary.

In the examples, molecular weight of each starting material (i.e., polyisobutylene (PIB) and polydimethylsiloxane (PDMS)) was determined by gel permeation chromatography (GPC) using a refractive index (RI) detector. These measurements were carried out in tetrahydrofuran (PIB smarting materials) or toluene (PDMS starting materials), using standard PIB samples or PDMS samples, respectively, for molecular weight calibration. The starting materials and copolymers were further characterized by IR, $^1$H, $^{13}$C, and $^{29}$Si Nuclear Magnetic Resonance (NMR) spectroscopy to confirm molecular structures.

Example 1

Telechelic allyl-functional polyisobutylene (PIB) was prepared by the method described in U.S. Pat. No. 4,758,631 to Kennedy, hereby incorporated by reference. This allyl-functional polyisobutylene had a number average molecular weight ($M_n$) of 5,050 and a weight average molecular weight ($M_w$) of 6,600. The degree of allyl end capping was determined to be 1.9±0.1 $^{13}$C NMR analysis. The allyl-functional PIB was, in turn, converted into a telechelic dimethylchlorosilyl-functional polyisobutylene by hydrosilation with dimethylchlorosilane, as follows.

Four hundred and fifty grams of the above allyl-functional PIB were dissolved in 200 g of toluene and charged to a three-neck flask fitted with a magnetic stirring bar, condenser and dropping funnel. A reaction product of chloroplatinic acid and divinyltetramethyl-disiloxane (170 µl of a catalyst complex prepared according to U.S. Pat. No. 3,419,593 to Willing which contained about 4.22% Pt) was added and the solution was heated to 70° C. under an atmosphere consisting of about 2 volume percent of oxygen in nitrogen. Dimethylchlorosilane was added dropwise. After about 1 ml of the silane had been introduced, the color of the solution changed to a golden yellow and heating was stopped. The addition rate of silane was then controlled so as to maintain a reaction temperature of 65° to 70° C. (total silane added= 50.6 ml; addition time=30 minutes). The solution was stirred overnight at 70°–75° C. and the solvent and excess silane stripped off in a rotary evaporator at 85°–90° C./2–5 torr/3 hours. A pale yellow polymer was obtained. NMR analysis confirmed the formation of a telechelic PIB polymer wherein the allyl functionality was quantitatively converted to end groups of the formula —Si(Me$_2$)Cl, in which Me hereinafter represents a methyl radical.

Example 2

A one liter flask equipped with a magnetic stirring bar was charged with 450 g of the telechelic dimethylchlorosilyl-functional polyisobutylene prepared in Example 1 and 300 g of tetrahydrofuran (THF). The contents were warmed to 45°–50° C. and a solution of 34 g of sodium bicarbonate in 300 g of water was added dropwise while stirring. This mixture was stirred for 1 hour. The organic and water layers were separated and the water layer was washed twice with 50 ml portions of THF, each of which was combined with the organic layer. The latter solution was dried over Na$_2$SO$_4$ overnight, filtered and the solvent removed using a rotary evaporator at 70° C. to yield 410 g of a pale yellow to off-white polymeric material. Analysis by $^{29}$Si NMR confirmed the presence of a telechelic dimethylsilanol-functional polyisobutylene having end groups of the formula —Si(Me$_2$)OH. The resulting silanol-functional PIB had $M_n$=6,440 and $M_w$=9080 (GPC in THF).

Example 3

The α,ω-dimethylsilanol-functional polyisobutylene represented by the formula PIB(SiMe$_2$OH)$_2$ (4.87 g, 7.56×10$^{-4}$ mol; 1.51×10$^{-3}$ mol SiOH), prepared in Example 2, was dissolved in THF (30 ml) and stored over 3 Å molecular sieves over night. This solution was treated with 0.8 ml of an n-butyllithium solution in hexane (1.28×10$^{-3}$ mol of n-BuLi) under nitrogen to form a lithiated polyisobutylene solution.

Hexamethylcyclotrisiloxane (D$_3$) (44.2 g) was stirred under nitrogen with 60.7 g of o-xylene. This mixture was azeotropically distilled and 2 ml of the D$_3$/xylene mixture were discarded. Acetonitrile (3.2 g), dimethylformamide (3.2 g) and the above described lithiated PIB solution were added to the D$_3$ solution, whereupon the color changed to a pale yellow. The mixture was stirred for about 3 hours and GC analysis showed about 15% of the D$_3$ remaining. The reaction was terminated by adding 0.2 g of acetic acid and stirring for two hours. The solvent and unreacted D$_3$ were removed on a rotary evaporator at 85°–90° C./1 mm Hg/2 hours. The resulting HOSiMe$_2$O—ABA—SiMe$_2$OH block copolymer (A=polydimethylsiloxane residue; B=PIB residue) was analyzed by GPC (in Toluene) and had $M_n$=11540 and $M_w$=13450.

Example 4

An α,ω-dimethylsilanol polyisobutylene, PIB(SiMe$_2$OH)$_2$, similar to that prepared in Example 2, was prepared by the methods outlined in Examples 1 and 2 and was analyzed by GPC (in THF): $M_n$=5900 and $M_w/M_n$=1.3. This α,ω-dimethylsilanol polyisobutylene (5.9 g; 1×10$^{-3}$ mol; 2×10$^{-3}$ mol SiOH) was dissolved in THF (20 ml) and stored over 3 Å molecular sieves over night. This solution was treated

9 with n-BuLi (0.6 ml, 9.6×10$^{-4}$ mol) under nitrogen to form a lithiated solution.

D$_3$ (44.2 g) was stirred under nitrogen with 71.8 g of o-xylene, azeotropically distilled and 6 ml of the D$_3$/xylene mixture was discarded. Acetonitrile (3.2 g), dimethylformamide (3.2 g) and the above prepared lithiated solution were added to the D$_3$ solution, whereupon the color changed to a pale yellow. The mixture was stirred for 3 hours and fifteen minutes and GC analysis showed about 5% of the D$_3$ remaining. The reaction was stopped by the addition of trimethylchlorosilane (0.32 g, 3×10$^{-3}$ mol), the mixture was stirred for two hours and then filtered through a pressure filter. A clear solution was obtained and the solvent and unreacted D$_3$ were removed on a rotary evaporator at 85°–90° C./1 mm Hg/2 hours. The resulting Me$_3$SiO—ABA—SiMe$_3$ block copolymer (A=polydimethylsiloxane residue; B=PIB residue) was analyzed by GPC (in toluene) and had M$_n$=8722 and M$_w$=12000.

Example 5

Glissopal® 1000 was hydrosilylated with dimethylchlorosilane as follows. Glissopal® 1000 is described as a polyisobutylene having a high proportion of double bonds at one end of its molecule and having a number average molecular weight of about 1180. It is a product of BASF Aktiengesellschaft (Germany). Glissopal® 1000 (300 g) was charged to a three-neck flask fitted with a magnetic stirring bar, condenser and dropping funnel. A toluene solution of a platinum complex made from platinous chloride and divinyltetramethyldisiloxane, as described in U.S. Pat. No. 5,175,325 to Brown et al. (250 µl of a 4.2% Pt solution) was added and this combination heated to 70° C. under an atmosphere of nitrogen. Dimethylchlorosilane was added dropwise, the addition rate being controlled so as to maintain a reaction temperature of 65° to 70° C. (total silane added=60 g). The solution was stirred overnight at 70°–75° C. and the solvent and excess silane stripped off in a rotary evaporator at 85°–90° C./2–5 torr/3 hours to provide a pale yellow polymer. NMR analysis confirmed a PIB polymer wherein the vinyl functionality was quantitatively converted to an end group of the formula —Si(Me$_2$)Cl.

The above hydrosilylated product was dissolved in 200 g of THF. Triethylamine (42 ml.) was introduced to the THF solution and distilled water (7 g) was then slowly added. The mixture was stirred vigorously for 30 minutes and salt byproduct was filtered off using a pressure filter. The water and organic layers were separated and the latter was stored over Na$_2$SO$_4$. Volatiles were removed by vacuum distillation to provide a monofunctional silanol-terminated polyisobutylene (PIB—SiMe$_2$OH) which contained the expected SiOH functionality, as evidenced by IR and $^{29}$Si NMR analysis. GPC (in THF) indicated M$_w$=1888 and M$_n$=1317.

Example 6

The monofunctional silanol terminated polyisobutylene prepared in Example 5 (10 g; 7.59×10$^{-3}$ mol) and stored over 3 Å molecular sieves was dissolved in THF (20 g) and n-BuLi (4 ml, 6.4×10$^{-3}$ mol) was added thereto under nitrogen to prepare a silanolate-functional polyisobutylene solution.

D$_3$ (100 g) was stirred under nitrogen with 110 g of o-xylene and this was azeotropically distilled, whereupon 6 ml of the D$_3$/xylene solution was discarded. Acetonitrile (6.1 g), dimethylformamide (6.7 g) and the above described silanolate-functional polyisobutylene solution were added to the D$_3$ solution. The mixture became warm immediately and

10 the color changed to a pale yellow. The mixture was stirred for 2 hours, at which point GC showed about 14% of the D$_3$ remaining. Reaction was stopped by the addition of acetic acid (0.4 g, 6×10$^{-3}$ mol) and the mixture was left to stir for two hours. The solvent and unreacted D$_3$ were removed on a rotary evaporator at 85°–90° C./1 mm Hg/2 hours and the product filtered through a pressure filter to provide a block copolymer of the formula B—A—SiMe$_2$OH where B represents polyisobutylene residue and A represents polydimethylsiloxane residue. GPC analysis (in toluene) indicated M$_n$=8385 and M$_w$=9552.

That which is claimed is:

1. A method for preparing a polyisobutylene-siloxane block copolymer, said method comprising:
   (I) lithiating
   (A) a polyisobutylene having one terminal silanol group with
   (B) an organolithium compound to provide a silanolate-functional polyisobutylene;
   (II) reacting the silanolate-functional polyisobutylene with
   (C) a hexaorganocyclotrisiloxane of the formula (R$_2$SiO)$_3$ in which R is a monovalent group independently selected from the group consisting of alkyl radicals having 1 to 6 carbon atoms, aryl radicals having 6 to 10 carbon atoms, and halogenated alkyl radicals having 2 to 6 carbon atoms to form a siloxanolate-functional block copolymer; and
   (III) capping the siloxanolate-functional block copolymer with a compound selected from the group consisting of
   (D) a silane of the formula R'$_{(4-a)}$SiX$_a$ wherein R' is a monovalent group independently selected from the group consisting of alkyl having 1 to 6 carbon atoms, alkenyl having 2 to 6 carbon atoms, aryl having 6 to 10 carbon atoms, halogenated alkyl having 2 to 6 carbon atoms, acryloxyalkyl radicals having 4 to 10 carbon atoms, methacryloxyalkyl radicals having 4 to 10 carbon atoms and alkenylaryl radicals having 8 to 14 carbon atoms, X is a hydrolyzable group and a is an integer having a value of 1 to 4, and
   (E) an acid.

2. The method according to claim 1, wherein said component (C) is hexamethylcyclotrisiloxane and the molar ratio of said organolithium compound to said silanol groups is 0.05 to 0.95.

3. The method according no claim 2, wherein X is chlorine and said acid (E) is selected from the group consisting of acetic acid and carbonic acid.

4. The method according to claim 3, wherein R' is a methyl radical.

5. The method according to claim 4, wherein a is 1 or 2.

6. The method according to claim 1, wherein said component (A) is a homopolymer consisting essentially of isobutylene units and having one terminal silanol group.

7. The method according to claim 6, wherein said component (C) is hexamethylcyclotrisiloxane and the molar ratio of said organolithium compound to said silanol groups is 0.3 to 0.95.

8. The method according to claim 7, wherein X is chlorine, R' is methyl and said acid is selected from the group consisting of acetic acid and carbonic acid.

9. A method for preparing a polyisobutylene-siloxane block copolymer, said method comprising:
   (I) lithiating
   (A) a telechelic silanol-functional polyisobutylene with
   (B) an organolithium compound to provide a silanolate-functional polyisobutylene;

(II) reacting the silanolate-functional polyisobutylene with
  (C) a hexaorganocyclotrisiloxane of the formula $(R_2SiO)_3$ in which R is independently selected from the group consisting of alkyl radicals having 1 to 6 carbon atoms, aryl radicals having 6 to 10 carbon atoms and halogenated alkyl radicals having 2 to 6 carbon atoms to form a siloxanolate-functional telechelic block copolymer; and (III) capping the siloxanolate-functional telechelic block copolymer with a compound selected from the group consisting of
  (D) a silane of the formula $R'_{(4-a)}SiX_a$ wherein R' is a monovalent group independently selected from the group consisting of alkyl having 1 to 6 carbon atoms, alkenyl having 2 to 6 carbon atoms, aryl having 6 to 10 carbon atoms, halogenated alkyl having 2 to 6 carbon atoms, acryloxyalkyl radicals having 4 to 10 carbon atoms, methacryloxyalkyl radicals having 4 to 10 carbon atoms and alkenylaryl radicals having 8 to 14 carbon atoms, X is a hydrolyzable group and a is an integer having a value of 1 to 2, and
  (E) an acid.

10. The method according to claim 9, wherein said component (C) is hexamethylcyclotrisiloxane and the molar ratio of said organolithium compound to said silanol groups is 0.05 to 0.95.

11. The method according to claim 10, wherein X is chlorine and said acid is acetic acid.

12. The method according to claim 11, wherein R' is a methyl radical.

13. The method according to claim 9, wherein said component (A) is a homopolymer consisting essentially of isobutylene units and having one terminal silanol group.

14. The method according to claim 13, wherein said component (C) is hexamethylcyclotrisiloxane and the molar ratio of said organolithium compound to said silanol groups is 0.3 to 0.95.

15. The method according to claim 14, wherein X is chlorine, R' is methyl and said acid is selected from the group consisting of acetic acid and carbonic acid.

16. A block copolymer prepared according to the method of claim 1.

17. A block copolymer prepared according to the method of claim 2.

18. A block copolymer prepared according to the method of claim 6.

19. A block copolymer prepared according to the method of claim 9.

20. A block copolymer prepared according to the method of claim 10.

21. A block copolymer prepared according to the method of claim 14.

* * * * *